United States Patent
Govoni et al.

(10) Patent No.: US 6,468,938 B1
(45) Date of Patent: Oct. 22, 2002

(54) PREPOLYMERIZED CATALYST COMPONENTS FOR THE POLYMERIZATION OF OLEFINS

(75) Inventors: Gabriele Govoni, Renazzo (IT); Mario Sacchetti, Ferrara (IT); Gianni Vitale, Ferrara (IT)

(73) Assignee: Basell Technology Company BV, Hoofddorp (NL)

( * ) Notice: Subject to any disclaimer, the term of this patent is extended or adjusted under 35 U.S.C. 154(b) by 0 days.

(21) Appl. No.: 09/273,624

(22) Filed: Mar. 23, 1999

(30) Foreign Application Priority Data

Mar. 23, 1998 (EP) .............................. 98200907

(51) Int. Cl.$^7$ ................................. B01J 31/00
(52) U.S. Cl. ....................... 502/126; 502/103; 502/104; 502/112; 502/113; 502/115; 502/116; 502/118; 502/128
(58) Field of Search ................. 502/103, 104, 502/112, 113, 115, 116, 118, 128

(56) References Cited

U.S. PATENT DOCUMENTS

| | | | |
|---|---|---|---|
| 4,220,554 A | 9/1980 | Scatá et al. .............. 252/429 B |
| 4,298,718 A | 11/1981 | Mayr et al. .................. 526/125 |
| 4,399,054 A | 8/1983 | Ferraris et al. ......... 252/429 B |
| 4,495,338 A | 1/1985 | Mayr et al. .................. 526/125 |
| 4,675,303 A | 6/1987 | Bacskai ...................... 502/115 |
| 4,771,024 A | 9/1988 | Nestlerode et al. ......... 502/127 |
| 5,352,749 A | 10/1994 | DeChellis et al. ............. 526/68 |
| 5,641,721 A | 6/1997 | Pentti et al. ................. 502/103 |
| 5,852,141 A | * 12/1998 | Malinge ..................... 526/119 |

FOREIGN PATENT DOCUMENTS

| | | |
|---|---|---|
| EP | A2 089 691 | 9/1983 |
| EP | A2 241 947 | 10/1987 |
| EP | 0 264 169 A1 | 4/1988 |
| EP | A2 395 083 | 10/1990 |
| EP | 0 562 928 A1 | 9/1993 |
| EP | 0 575 118 A2 | 12/1993 |
| EP | 0 712 869 A1 | 5/1996 |
| EP | 0 789 037 A2 | 8/1997 |
| JP | SHO 63(1988)-89509 | 4/1988 |
| JP | SHO 63(1988)-89511 | 4/1988 |
| WO | WO 94/28032 | 12/1994 |
| WO | WO 95/22565 | 8/1995 |

OTHER PUBLICATIONS

European Search Report for PCT/EP99/01804, dated Aug. 5, 1999.

* cited by examiner

Primary Examiner—Elizabeth D. Wood
(74) Attorney, Agent, or Firm—Bryan Cave LLP

(57) ABSTRACT

The invention provides new prepolymerized catalyst components for the (co)polymerization of olefins $CH_2=CHR$, wherein R is hydrogen or a C1–C12 alkyl group, characterized by comprising a solid catalyst component, comprising Ti, Mg, halogen and an electron donor compound, being capable of yielding, under standard polymerization conditions, a propylene homopolymer having an insolubility in xylene at 25° C. higher than 90%, which is prepolymerized with ethylene to such an extent that the amount of the ethylene prepolymer is up to 100 g per g of said solid catalyst component. These solid catalyst components display to obtain a high catalyst activity, a high isotactic index, and are not affected by aging.

2 Claims, No Drawings

PREPOLYMERIZED CATALYST COMPONENTS FOR THE POLYMERIZATION OF OLEFINS

The present invention relates to catalyst components for the polymerization of olefins $CH_2=CHR$, wherein R is hydrogen or a hydrocarbon radical having 1–12 carbon atoms, the catalysts obtained therefrom and their use in the polymerization of said olefins. In particular the catalyst components of the present invention are very suitable for the preparation of crystalline propylene (co)polymers by using gas-phase, slurry or bulk (co)polymerization processes.

High-yield catalyst components for the polymerization of olefins and in particular for propylene are known in the art. They are generally obtained by supporting, on a magnesium dihalide, a titanium compound and an electron donor compound as a selectivity control agent. Said catalyst components are then used together with an aluminum alkyl and, optionally, another electron donor (external) compound in the stereospecific polymerization of propylene. Depending on the type of electron donor used the stereoregularity of the polymer can vary. However, the stereospecific catalysts of interest should be able to give polypropylene (co)polymers having isotactic index, expressed in terms of xylene insolubility, of higher than 90%.

Said catalyst components, and the catalysts obtained therefrom, are largely used in the plants for the (co)polymerization of propylene both operating in liquid phase (slurry or bulk) and in gas-phase. However, the use of the catalyst components as such is not completely satisfactory. Indeed, problems such as formation of polymers with irregular morphology and in particular of fines, low bulk density and low catalyst activity are experienced when plants operate with catalyst components as such.

In order to solve these problems, an additional prepolymerization line may be included, in which the catalyst is prepolymerized under controlled conditions, so as to obtain prepolymerized catalysts having good morphology. After prepolymerization, the catalysts also increase their resistance in such a way that the tendency to break under polymerization conditions is decreased. As a consequence, also the formation of fines is reduced. Moreover also the activity of the catalyst and the bulk density of the final polymers results to be improved. The use of this additional line, however, makes the plant operations and design more complex and costly; in certain cases it is therefore desirable to avoid it.

One of the alternative solutions is that of supplying the plants directly with a prepolymerized catalyst which can be prepared in another facility. This solution requires the preparation of a prepolymerized catalyst meeting certain requirements such as easy preparation and handling, easy stocking operability, absence or minimal reduction of activity with time (aging) preferably coupled with a basic high activity. U.S. Pat. No. 5,641,721 discloses a method for preparing a prepolymerized catalyst comprising (i) the preparation of a procatalyst composition by depositing a transition metal compound on a suitable support, (ii) mixing said procatalyst composition with a viscous substance and then prepolymerizing said procatalyst composition with a monomer in the presence of said viscous substance. The viscous substance has a viscosity of from 1000 to 15000 cP while the monomer used is propylene. Albeit it is alleged that the catalyst activity is unchanged after 5 months, it appears that the selectivity is decreased. Moreover, the prepolymerization in such a viscous substance makes the preparation of the prepolymerized catalyst complex and, in addition, leads to a low catalyst activity.

It has now surprisingly been found that by carrying out the prepolymerization with a specific monomer it is possible to obtain a catalyst for the polymerization of olefins which has a high catalyst activity, a high isotactic index and which is not affected by aging.

It is therefore an object of the present invention a prepolymerized catalyst component for the (co)polymerization of olefins $CH_2=CHR$, wherein R is hydrogen or a C1–C12 alkyl group, characterized by comprising a solid catalyst component, comprising Ti, Mg, halogen and an electron donor compound, being capable of yielding, under standard polymerization conditions, a propylene homopolymer having an insolubility in xylene at 25° C. higher than 90%, which is prepolymerized with ethylene to such an extent that the amount of the ethylene prepolymer is up to 100 g per g of said solid catalyst component. Preferably the amount of ethylene polymer is less than 15 g and more preferably said amount is less than 5 g per g of solid catalyst component.

In particular, the catalyst components comprise a titanium compound, having at least a Ti-halogen bond and the above mentioned electron donor compound supported on a Mg halide. The magnesium halides, preferably $MgCl_2$, in active form used as a support for Ziegler-Natta catalysts, are widely known from the patent literature. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium and y is a number between 1 and n, can be used.

The internal electron-donor compound may be selected from esters, ethers, amines and ketones. It is preferably selected from alkyl, cycloalkyl or aryl esters of monocarboxylic acids, for example benzoic acid, or polycarboxylic acids, for example phthalic or malonic acid, the said alkyl, cycloalkyl or aryl groups having from 1 to 18 carbon atoms. Moreover, it can be also selected from 1,3-diethers of formula (I):

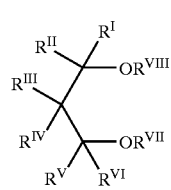

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle. Particularly preferred are the 1,3-diethers in which $R^{VII}$ and $R^{VIII}$ are selected from $C_1$–$C_4$ alkyl radicals.

Examples of preferred electron-donor compounds are methyl benzoate, ethyl benzoate, diisobutyl phthalate and 9,9-bis(methoxymethyl)fluorene. As explained above, however, the internal electron donor compound must be selected in such a way to have a final solid catalyst component capable of producing, under the standard polymerization test disclosed below, a propylene homopolymer having an insolubility in xylene at 25° C. higher than 90%.

The preparation of the solid catalyst component can be carried out according to several methods. According to one of these methods, the magnesium dichloride in an anhydrous state, the titanium compound and the electron donor compound of formula (I) are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compound is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. in the presence of the electron donor compound. The treatment with $TiCl_4$ is repeated and the solid is washed with hexane in order to eliminate any non-reacted $TiCl_4$. A further method comprises the reaction between magnesium alcoholates or chloroalcoholates (in particular chloroalcoholates prepared according to U.S. Pat. No. 4,220,554) and an excess of $TiCl_4$ in the presence of an electron donor compound (I) at a temperature of about 80 to 120° C.

Particularly preferred are the solid catalyst component prepared by reacting a titanium compound of formula $Ti(OR)n-yX_y$, where n is the valence of titanium and y is a number between 1 and n, preferably $TiCl_4$, with an adduct of formula $MgCl_2 \cdot pROH$, where p is a number between 0,1 and 6 and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C). Then, the emulsion is quickly quenched, thereby causing the solidification of the adduct in form of spherical particles. Examples of spherical adducts prepared according to this procedure are described in U.S. Pat. No. 4,399,054. The so obtained adduct can be directly reacted with the Ti compound or it can be previously subjected to thermal controlled dealcoholation (80–130° C.) so as to obtain an adduct in which the number of moles of alcohol is generally lower than 3 preferably between 0.1 and 2.5. The dealcoholated adduct is then suspended in cold $TiCl_4$ (generally 0° C.); the mixture is heated up to 80–130° C. and kept at this temperature for 0.5–2 hours. The treatment with $TiCl_4$ can be carried out one or more times. The internal electron donor compound can be added during the treatment with $TiCl_4$. The treatment with the electron donor compound can be repeated one or more times.

The preparation of catalyst components in spherical form is described for example in European Patent Applications EP-A-395083.

The solid catalyst components obtained according to the above method show a surface area (by B.E.T. method) generally between 20 and 500 $m^2/g$ and preferably between 50 and 400 $m^2/g$, and more preferably between 100 and 400 $m^2/g$; a total porosity (by B.E.T. method) higher than 0.2 $cm^3/g$ preferably between 0.2. and 0.6 $cm^3/g$ and more preferably from 0.3 to 0.5 $cm^3/g$. The porosity (Hg method) due to pores with radius up to 10.000Å generally ranges from 0.3 to 1.5 $cm^3/g$, preferably from 0.45 to 1 $cm^3/g$.

A further method to prepare the solid catalyst component of the invention comprises halogenating magnesium dihydrocarbyloxide compounds, such as magnesium dialkoxide or diaryloxide, with solution of $TiCl_4$ in aromatic hydrocarbon (such as toluene, xylene etc.) at temperatures between 80 and 130° C. The treatment with $TiCl_4$ in aromatic hydrocarbon solution can be repeated one or more times, and the internal electron donor compound is added during one or more of these treatments. In any of these preparation methods, the desired internal electron donor compound can be added as such or, in an alternative way, it can be obtained in situ by using an appropriate precursor capable to be transformed in the desired electron donor compound by means, for example, of known chemical reactions such as esterification, transesterification etc. Generally, the internal electron donor compound is used in molar ratio with respect to the $MgCl_2$ of from 0.01 to 1 preferably from 0.05 to 0.5.

As explained above the prepolymerized catalyst component can be obtained by prepolymerizing the solid catalyst component together with ethylene. The prepolymerization is normally carried out in the presence of an Al-alkyl compound.

The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminums with alkylaluminum halides, alkylaluminum hydrides or alkylaluminum sesquichlorides such as $AlEt_2Cl$ and $Al_2Et_3Cl_3$.

It has been found particularly advantageous to carry out said prepolymerization using low amounts of alkyl-Al compound. In particular said amount can be such as to have an Al/Ti molar ratio from 0.0001 to 50, preferably from 0.001 to 10 and more preferably from 0.01 to 1.

Moreover, it has also been found advantageous to carry out said prepolymerization in the absence of an external donor compound.

The prepolymerization can be carried out in liquid phase, (slurry or solution) or in gas-phase at temperatures generally lower than 80° C., preferably between −20 and 50° C. Furthermore, it is preferably carried out in a liquid diluent in particular selected from liquid hydrocarbons. Among them, pentane, hexane and heptane are preferred.

As explained the so obtained prepolymerized catalyst components can be used in the polymerization of olefins, and in particular of propylene, allowing to obtain high activity and polymers with high stereoregularity, high bulk density and very good morphology thus showing their particular suitability for the liquid (bulk or slurry) and gas-phase processes. In addition, as it is shown in the examples, aging problems are solved since the activity of the catalyst remains unaltered or even improved in some cases, after several months of time. Accordingly, the catalyst components of the invention are particularly suitable for the use in liquid or gas-phase olefin polymerization plants operating without a prepolymerization line.

In particular, said olefin polymerization processes can be carried out in the presence of a catalyst comprising (A) the prepolymerized catalyst component; (B) an Al-alkyl compound of the type described above and optionally (C) one or more electron donor (external) compound.

This latter can be of the same type or it can be different from the internal donor described above. Suitable external electron donor compounds include silicon compounds, ethers, esters, amines, heterocyclic compounds and particularly 2,2,6,6-tetramethyl piperidine, ketones and the 1,3-diethers of the general formula (I) given above.

Another class of preferred external donor compounds is that of silicon compounds of formula $R_a{}^5R_b{}^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a $C_{1-C10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1, trifluoropropyl-2-ethylpiperidinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysi lane, t-butyltrimethoxysilane and thexyltrimethoxysilane.

In particular when esters of monocarboxylic acids, for example benzoates are used as internal donors also the external donor compound is selected from this class p-ethoxy-ethyl benzoate being the most preferred. In addition, a mixture of this donor with another one and in particular one selected from the class of silicon compounds can be used. In this case methylcyclohexyldimethoxysilane and dicyclopentyldimethoxysilane are most preferred.

The electron donor compound (C) is used in such an amount to give a molar ratio between the organoaluminum compound and said electron donor compound of from 0.1 to 500, preferably from 1 to 300 and more preferably from 3 to 100.

The above described polymerization process can be carried out under the polymerization conditions generally known in the art. Accordingly, the polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa.

In any of the polymerization processes used (liquid or gas-phase polymerization) the catalyst forming components (A), (B) and optionally (C), can be pre-contacted before adding them to the polymerization reactor. Said pre-contacting step can be carried out in the absence of polymerizable olefin or optionally in the presence of said olefin in an amount up to 3 g per g of solid catalyst component. The catalyst forming components can be contacted with a liquid inert hydrocarbon solvent such as propane, n-hexane, or n-heptane at a temperature below about 60° C. and preferably from about 0° C. to 30° C. for a time period of from 10 seconds to 60 minutes.

When a gas-phase polymerization process is used, it can be carried out according to known techniques operating in one or more reactors having a fluidized or mechanically agitated bed. Inert fluids such as nitrogen, or low hydrocarbons like propane, can be used both as a fluidization aid and in order to improve the thermal exchange within the reactors. In addition, also techniques increasing the removal of the reaction heat comprising the introduction of liquids, optionally in mixture with gas, into the reactors, can be used. Preferably the liquids are fresh or make-up monomers. Such techniques are disclosed for example in EP-A-89691, EP-A-241947, U.S. Pat. No. 5,352,749, WO94/28032 and EPA-695313.

The following examples are given in order better illustrate the invention without limiting it.

EXAMPLES

Characterization

Determination of X.I.

2.5 g of polymer were dissolved in 250 ml. of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I %.

General Procedure for the Standard Propylene Polymerization Test

A 4-liter steel autoclave equipped with a stirrer, pressure gauge, thermometer, catalyst-feeding system, monomer feeding lines and thermostatting jacket, was used. The reactor was charged with 0.01 g of solid catalyst component and with TEAL, and cyclohexyl-methyl dimethoxy silane in such amounts to give an Al/Donor molar ratio of 20. Moreover, 3.2 l of propylene, and 1.5 l of hydrogen were added. The system was heated to 70° C. over 10 min. under stirring, and maintained under these conditions for 120 min. At the end of the polymerization, the polymer was recovered by removing any unreacted monomers and was dried under vacuum.

Determination of Melt Index

ASTM D 1238 condition "L"

EXAMPLES 1–2 AND COMPARISON EXAMPLE 3

Preparation of Solid Catalyst Component

Into a 500 ml four-necked round flask, purged with nitrogen, 250 ml of TiCl4 were introduced at 0° C. While stirring, 10 g of microspheroidal $MgCl_2.C_2H_5OH$ containing about 54% weight of alcohol were added. The flask was heated to 40° C. and 6 mmoles of diisobutylphthalate were thereupon added. The temperature was raised to 100° C. and maintained for two hours, then the stirring was discontinued, the solid product was allowed to settle and the supernatant liquid was siphoned off.

The treatment with $TiCl_4$ was repeated and the solid obtained was washed six times with anhydrous hexane (6×100 ml) at 60° C. and then dried under vacuum: The characteristics of the catalyst components and the results of the propylene polymerization test procedure are reported in table 1.

Ethylene Prepolymerization

The catalyst components prepared according to the above procedure were prepolymerized with ethylene under the conditions reported in table 2. In comparison example 3 prepolymerization was not carried out.

Propylene Polymerization

The prepolymerized catalyst obtained was then used in the polymerization of propylene carried out in a bulk pilot polymerization plant under the following conditions:

Al/Cat (weight ratio): 8

Al/Donor (weight ratio): 6

Donor/cat (weight ratio): 1.3
Time (min.): 80
Temperature (° C.): 70
   The results are shown in table 3.

EXAMPLE 4–5 AND COMPARISON EXAMPLE 6

Preparation of the Catalyst Component
   The catalyst components were prepared according to the procedure of example 1 but using ethyl benzoate instead of diisobutylphthalate. The characteristics of the catalyst components and the results of the propylene polymerization test procedure are reported in table 1.
Ethylene Prepolymerization
   The catalyst components prepared according to the above procedure were prepolymerized with ethylene under the conditions reported in table 2. In comparison example 6 prepolymerization was not carried out.
Propylene Polymerization
   The catalyst components obtained were then used in the polymerization of propylene which was carried out in a bulk pilot polymerization plant under the following conditions:
Al/Cat (weight ratio): 4.6
Al/Donor (weight ratio): 1.4
Donor/cat (weight ratio): 3.2
Time (min.): 80
Temperature (° C.): 70 using p-ethoxy-ethylbenzoate as external donor The results are shown in table 3.

EXAMPLE 7 AND COMPARISON EXAMPLE 8

The catalyst components were prepared according to the procedure of example 4 but using 9,9-bis(methoxymethyl)-fluorene instead of ethyl benzoate. The characteristics of the catalyst components and the results of the propylene polymerization test procedure are reported in table 1.
Ethylene Prepolymerization
   The catalyst components prepared according to the above procedure were prepolymerized with ethylene under the conditions reported in table 2. In comparison example 8 prepolymerization was not carried out.
Propylene Polymerization
   The catalyst components obtained were then used in the polymerization of propylene which was carried out in a bulk pilot polymerization plant under the following conditions:
Al/Cat (weight ratio): 13.7
Time (min.): 80
Temperature (° C): 70 without using an external donor. The results are shown in table 3.
Evaluation of Aging Properties
   The catalyst components prepared according to the examples 4 and 5 were tested for the polymerization of propylene in order to evaluate their aging properties. A first test was carried out after the prepolymerization and a further test was carried out after 120 days. All the tests were carried out according to the general standard procedure but using p-ethoxy-ethylbenzoate as external donor in an amount such as to give an Al/donor molar ratio of 1.8. The results are reported in table 4.

TABLE 1

| | Solid catalyst components | | | |
|---|---|---|---|---|
| Example | Ti (%) | Mg (%) | Donor (%) | Xyl.Ins. |
| 1 | 3 | 18.8 | 9.6 | 98.1 |
| 2 | 3.1 | 18.9 | 9.5 | 97.9 |

TABLE 1-continued

| | Solid catalyst components | | | |
|---|---|---|---|---|
| Example | Ti (%) | Mg (%) | Donor (%) | Xyl.Ins. |
| comp 3 | 3 | 18.9 | 9.4 | 98.1 |
| 4 | 4.3 | 17 | 13.5 | 95.9 |
| 5 | 3.4 | 17.5 | 13.8 | 95.6 |
| comp.6 | 4.1 | 17.1 | 13.3 | 96 |
| 7 | 4.1 | 15.5 | 17.2 | 97 |
| comp.8 | " | " | " | " |

TABLE 2

| | Prepolymerized catalyst components Prepolymerization conditions | | | |
|---|---|---|---|---|
| Example | Al/cat (wt) | Cat/C2- | Time (min.) | Temp. (° C.) |
| 1 | 0.004 | 1 | 300 | 20 |
| 2 | 0.004 | 1 | 300 | 20 |
| comp.3 | — | — | — | — |
| 4 | 0.005 | 1 | 300 | 20 |
| 5 | 0.01 | 1 | 300 | 20 |
| comp.6 | — | — | — | — |
| 7 | 0.005 | 1 | 300 | 20 |
| Comp.8 | — | — | — | — |

TABLE 3

| | Polymerization results with the prepolymerized catalyst components | | | |
|---|---|---|---|---|
| Example | Yield | Xyl.Ins. | Bulk Density | MIL |
| 1 | 23 | 96 | 0.47 | 1.3 |
| 2 | 24 | 96 | 0.48 | 1.2 |
| comp.3 | 16 | 95 | 0.32 | 1.4 |
| 4 | 28 | 95.5 | 0.43 | 1.6 |
| 5 | 30 | 95 | 0.42 | 2 |
| comp.6 | 20 | 94 | 0.3 | 3 |
| 7 | 78 | 96.3 | 0.43 | 1 |
| Comp.8 | 55 | 95 | 0.32 | 1 |

TABLE 4

| Example | Aging (days) | Yield kg/g | Xyl.Ins. | Bulk density |
|---|---|---|---|---|
| 4 | 0 | 38.6 | 94.4 | 0.38 |
| 4 | 120 | 41.4 | 94.6 | 0.41 |
| 5 | 0 | 35.3 | 94.3 | 0.385 |
| 5 | 120 | 36.1 | 95 | 0.40 |

What is claimed is:

1. A prepolymerized catalyst component for the polymerization of olefins $CH_2=CHR$ comprising a solid catalyst component obtained by reacting $TiCl_4$ with an adduct of formula $MgCl_2 \cdot pR'OH$ and an internal electron donor compound selected from 1,3-diethers of formula (I):

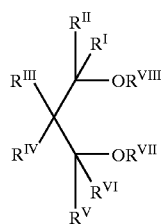

(I)

being prepolymerized with ethylene to such an extent that the amount of the ethylene prepolymer is up to 100 g per g of solid catalyst component;

wherein said solid catalyst component is capable of yielding in the standard propylene polymerization test a propylene homopolymer having an insolubility in xylene at 25° C. higher than 90%, wherein R is hydrogen or a $C_1$–$C_{12}$ alkyl group, wherein p is a number between 0.1 and 6 and R' is a hydrocarbon radical having 1–18 carbon atoms, and wherein $R^I$, $R^{II}$, $R^{III}$, $R^{IV}$, $R^V$, and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^{I-RVI}$ except that they cannot be hydrogen; one or more of the $R^I$–$R^{VIII}$ groups can be linked to form a cycle.

2. Catalyst component according to claim 1 in which $R^{VII}$ and $R^{VIII}$ are selected from $C_1$–$C_4$ alkyl radicals and the groups $R^{III}$ and $R^{IV}$ are linked to form a cycle.

* * * * *

UNITED STATES PATENT AND TRADEMARK OFFICE
CERTIFICATE OF CORRECTION

PATENT NO. : 6,468,938 B1
DATED : October 22, 2002
INVENTOR(S) : Gabriele Govoni et al.

It is certified that error appears in the above-identified patent and that said Letters Patent is hereby corrected as shown below:

<u>Column 10,</u>
Line 10, change "$R^I\text{-}^{RVI}$" to -- $-R^I\text{-}R^{VI}$ --.

Signed and Sealed this

Twenty-ninth Day of April, 2003

JAMES E. ROGAN
*Director of the United States Patent and Trademark Office*